(12) United States Patent
Hojaji et al.

(10) Patent No.: US 9,643,876 B2
(45) Date of Patent: May 9, 2017

(54) MICROSPHERES AND METHODS OF MAKING THE SAME

(71) Applicants: Hamid Hojaji, Kensington, MD (US); Laura Gabriela Kocs, Feldafing (DE)

(72) Inventors: Hamid Hojaji, Kensington, MD (US); Laura Gabriela Kocs, Feldafing (DE)

( * ) Notice: Subject to any disclaimer, the term of this patent is extended or adjusted under 35 U.S.C. 154(b) by 2 days.

(21) Appl. No.: 14/874,433

(22) Filed: Oct. 4, 2015

(65) Prior Publication Data
US 2017/0096360 A1  Apr. 6, 2017

(51) Int. Cl.
| | | |
|---|---|---|
| C03B 19/10 | (2006.01) | |
| C04B 14/24 | (2006.01) | |
| C08K 7/28 | (2006.01) | |
| C03B 19/08 | (2006.01) | |

(52) U.S. Cl.
CPC ............ C03B 19/108 (2013.01); C03B 19/08 (2013.01); C04B 14/24 (2013.01); C08K 7/28 (2013.01)

(58) Field of Classification Search
None
See application file for complete search history.

(56) References Cited

U.S. PATENT DOCUMENTS

| | | | | |
|---|---|---|---|---|
| 2,978,340 A | * | 4/1961 | Alford ................. | C03B 19/107 106/601 |
| 3,365,315 A | * | 1/1968 | Beck ..................... | C03B 19/107 264/31 |
| 3,752,685 A | * | 8/1973 | Honda et al. .......... | C04B 14/16 106/280 |
| 4,430,108 A | | 2/1984 | Hojaji et al. | |
| 4,661,137 A | | 4/1987 | Garnier et al. | |
| 4,778,502 A | | 10/1988 | Garnier et al. | |
| 5,270,292 A | | 12/1993 | Hojaji et al. | |

(Continued)

FOREIGN PATENT DOCUMENTS

| | | | |
|---|---|---|---|
| AU | WO2004101137 | * | 11/2004 |
| AU | 2006342007 B2 | | 10/2007 |

(Continued)

OTHER PUBLICATIONS

Pavlushkin N.M., "Chemical technology of glass and ceramics", Moscow, Stoiizdat, pp. 89-90, 1983.

(Continued)

Primary Examiner — Melvin C Mayes
Assistant Examiner — Colette Nguyen (57) ABSTRACT

A method of manufacturing a plurality of expanded microspheres, comprises mixing a plurality of solid particles, at least one binding material capable of binding the plurality of solid particles, and a plurality of reactive expansion components into a batch, forming a plurality of agglomerated particles from the batch, heating the plurality of agglomerated particles in an expansion equipment to above a softening temperature of at least a portion of the plurality of agglomerated particles and activating the plurality of reactive expansion components, and forming a gas and expanding the plurality of agglomerated particles into the plurality of expanded microspheres, the step of activating the plurality of reactive expansion components occurring independently from a chemical composition of an atmosphere surrounding the plurality of agglomerated particles inside the expansion equipment.

20 Claims, 4 Drawing Sheets

(56) References Cited

U.S. PATENT DOCUMENTS

| | | |
|---|---|---|
| 5,306,700 A | 4/1994 | Hojaji |
| 5,405,590 A | 4/1995 | Macedo et al. |
| 5,430,236 A | 7/1995 | De Macedo et al. |
| 5,613,994 A | 3/1997 | Muniz et al. |
| 5,678,236 A | 10/1997 | Macedo et al. |
| 5,766,296 A | 6/1998 | Moreau |
| 6,334,337 B1 | 1/2002 | Macedo et al. |
| 6,531,222 B1 | 3/2003 | Tanaka et al. |
| 6,964,809 B2 | 11/2005 | Hojaji et al. |
| 7,311,965 B2 | 12/2007 | Hojaji et al. |
| 7,455,798 B2 | 11/2008 | Datta et al. |
| 7,651,563 B2 | 1/2010 | Datta et al. |
| 7,666,505 B2 | 2/2010 | Datta et al. |
| 7,744,689 B2 | 6/2010 | Hojaji et al. |
| 7,878,026 B2 | 2/2011 | Datta et al. |
| 7,897,534 B2 | 3/2011 | Biscan et al. |
| 7,976,939 B2 | 7/2011 | Hojaji et al. |
| 8,197,932 B2 | 6/2012 | Buarque de Macedo et al. |
| 8,236,415 B2 | 8/2012 | Hojaji et al. |
| 8,414,699 B2 | 4/2013 | Hojaji et al. |
| 8,574,358 B2 | 11/2013 | Biscan et al. |
| 8,609,244 B2 | 12/2013 | Zhang et al. |
| 9,016,090 B2 | 4/2015 | Hojaji et al. |
| 2001/0043996 A1 | 11/2001 | Yamada et al. |
| 2002/0004111 A1 | 1/2002 | Matsubara et al. |
| 2004/0081827 A1* | 4/2004 | Datta ............... C03C 11/002 428/384 |
| 2006/0075704 A1 | 4/2006 | Hojaji et al. |
| 2007/0131145 A1 | 6/2007 | Biscan et al. |
| 2007/0275335 A1 | 11/2007 | Biscan et al. |
| 2008/0096018 A1 | 4/2008 | Zhang et al. |
| 2008/0202389 A1 | 8/2008 | Hojaji et al. |
| 2008/0257218 A1 | 10/2008 | Hojaji et al. |
| 2009/0008223 A1 | 1/2009 | Fujii |
| 2009/0076196 A1 | 3/2009 | Hojaji |
| 2009/0146108 A1 | 6/2009 | Datta et al. |
| 2009/0156385 A1 | 6/2009 | Biscan et al. |
| 2010/0040881 A1 | 2/2010 | Beck |
| 2010/0192808 A1* | 8/2010 | Datta ............... C04B 18/027 106/672 |
| 2011/0098171 A1 | 4/2011 | Pedeboscq et al. |
| 2011/0152057 A1 | 6/2011 | Qi |
| 2011/0160104 A1* | 6/2011 | Wu ............... C04B 35/195 507/269 |
| 2012/0058343 A1 | 3/2012 | Lu |
| 2013/0206408 A1* | 8/2013 | Chatterjee ......... C04B 33/1352 166/280.1 |
| 2013/0344337 A1 | 12/2013 | Qi |
| 2015/0128645 A1 | 5/2015 | Hojaji et al. |
| 2015/0128831 A1 | 5/2015 | Hojaji et al. |
| 2015/0135774 A1 | 5/2015 | Hojaji et al. |
| 2015/0329769 A1 | 11/2015 | Ravi |
| 2016/0207817 A1 | 7/2016 | Hojaji et al. |

FOREIGN PATENT DOCUMENTS

| | | |
|---|---|---|
| BE | WO2007119121 * | 10/2007 |
| EP | 0359362 A2 | 3/1990 |
| EP | 0801037 A1 | 10/1997 |
| EP | 1156021 A1 | 11/2001 |
| EP | 1160212 A1 | 12/2001 |
| EP | 3008020 A1 | 4/2016 |
| GB | 2192392 A | 1/1988 |
| JP | H0977543 A | 3/1997 |
| JP | H1095648 A | 4/1998 |
| JP | H10152356 A | 6/1998 |
| JP | H11116299 A | 4/1999 |
| JP | 1156021 * | 5/2001 |
| JP | 2001130940 A | 5/2001 |
| JP | 2002003248 A | 1/2002 |
| RU | 2001027 C1 | 10/1993 |
| RU | 2016702 C1 | 7/1994 |
| RU | 2276638 C1 | 5/2006 |
| RU | 2307432 C2 | 9/2007 |
| RU | 2336293 C1 | 10/2008 |
| RU | 98018 U1 | 9/2010 |
| WO | 95/04010 A1 | 2/1995 |
| WO | 96/07538 A1 | 3/1996 |
| WO | 01/72863 A1 | 10/2001 |
| WO | 2004/018090 A1 | 3/2004 |
| WO | 2004/101137 A1 | 11/2004 |
| WO | 2005/092818 A1 | 10/2005 |
| WO | 2007/070427 A1 | 6/2007 |
| WO | 2008/131026 A1 | 10/2008 |

OTHER PUBLICATIONS

Zivica, "High effective silica fume alkali activator", Bull. Mater. Sci., vol. 27, No. 2, pp. 179-182, 2004.

Michael E. Smith, Allan B. Barnes, Dennis F. Bickford, Kenneth J. Imrich, Daniel C. Iverson, Hector N. Guerrero, "DWPF Glass Air-Lift Pump Life Cycle Testing and Plant Implementation", paper proposed for a presentation and publication in the conference transactions of the 106th Annual American Ceramic Society Convention, Indianapolis, Indiana, Apr. 18-21, 2004, 2004, 9 pages, Springfield, VA, USA.

Hector N. Guerrero, Dennis F. Bickford "DWPF Melter Air-Lift Bubbler: Development and Testing for Increasing Glass Melt Rates and Waste Dissolution", Savannah River Technology Center, May 2002, 23 pages, Aiken, SC, USA.

Kenneth J. Imrich, Michael E. Smith, Dennis F. Bickford "DWPF Air Lift Pump Life Cycle Evaluation (U)", Westinghouse Savannah River Company, Feb. 2, 2004, 21 pages, Aiken, SC, USA.

* cited by examiner

MICROSPHERES AND METHODS OF MAKING THE SAME

THE FIELD OF INVENTION

The present invention is directed to expanded microspheres and methods of making the same. Specifically, the present invention is directed to expanded microspheres having a predetermined porosity configuration, and to their methods of manufacture that among others provide for gas forming reaction(s) responsible for expanding the microspheres, expansion that is independent from the chemical composition of an atmosphere surrounding the microspheres inside an expansion equipment.

DESCRIPTION OF RELATED ART

Microspheres are produced by a number of methods, among which, a two-step process is common. In one method, in a first step of the two-step process, a plurality of solid particles is processed from a mixture by agglomerating the mixture into a plurality of agglomerated particles. In another method, in a first step of the two-step process, a plurality of solid particles are processed from a glass melt, by first cooling the glass melt to solidify, and then pulverizing the solid glass into a plurality of discrete glass particles. In the second step, which is common for both methods, the plurality of agglomerated particles, or glass particles are heated to a temperature high enough to sufficiently melt and simultaneously expand the particles into a plurality of expanded microspheres. The expansion occurs due to the formation of gas provided by the reaction of blowing agents or foaming agents included in the plurality of agglomerated particles or glass particles.

The volume of gas released by the various blowing agents depends on the chemical composition and the physical characteristics of the furnace atmosphere that surrounds the plurality of particles during the heating process. As such the volume and the composition of gas created during the expansion of the heated plurality of particles strongly depends upon the chemistry of the atmosphere surrounding the particles inside a heating device (e.g. inside a furnace). One of the important parameters of the furnace atmosphere is oxygen concentration. Oxygen concentration is related to the oxygen partial pressure, and oxygen fugacity in the furnace atmosphere.

When combusting fossil fuels such as natural gas, in addition to combustion with primary air, a secondary air is also introduced to facilitate transporting the plurality of agglomerated particles into the combustion zone. Controlling and maintaining a precise oxygen concentration in the combustion zone is challenging because of the high turbulence created by the combustion gas, air (primary and secondary), and combustion gaseous byproducts being generated in the combustion zone. Maintaining a precise oxygen concentration in the furnace combustion zone is further challenging due to the presence of a relatively high concentration of solids floating randomly inside the combustion zone.

In the combustion zone the particles are heated rapidly and their temperature reaches a peak temperature in a fraction of a second to several seconds. Within this very short time, gas is created due to the activation of blowing agents, transforming the softened particles into a plurality of expanded microspheres. The rate and volume of gas generated within the particles are dependent on the oxygen concentration in the combustion zone. Due to intense turbulence, and thus fluctuation of oxygen within the bounds of the combustion zone, some particles may not expand sufficiently, while others may over expand, causing them to possibly collapse, or become susceptible to excessive breakage during handling and usage.

Under and over expanded microspheres are considered off-specification, and may need to be separated from the final product, resulting in a reject portion. The size of the reject portion (measured either by volume or mass) is inversely proportional to the corresponding process yield. A low yield indicating a high reject portion is not desirable. In most cases the reject portion is recycled back into the process, or in some cases is disposed of in some other manner. In either case, a low yield is indicative of low production efficiency.

Therefore, what are needed are solutions that lead to increased production yield, especially in cases that the low production yield is due to the fluctuation of oxygen in the furnace atmosphere.

Another challenge is to manufacture microspheres/microparticles with a predetermined porosity configuration for specialized applications. Porosity configuration includes parameters such as fraction of open and closed porosities, particle density, pore size, etc. Such microspheres are required in a plurality of specialized applications such as catalyst beds, drug delivery substrates, particles or particle beds having tunable permeability characteristics, particles or particle beds having tunable diffusivity characteristics, etc. The microspheres should be robust so they can be handled and transported safely, and be economically feasible to manufacture.

Recycling industrial byproducts has become a priority in environmental stewardship. Pulverizing, grinding, and size reducing brittle materials such as those made from glass, ceramics, rocks, etc., leads to the creation of very fine powders and dust particles. What are needed are methods that efficiently use these fine powders and dust particles while creating sought-after and value added products such as expanded microspheres having a predetermined pore structure.

The art does not provide for methods of manufacturing such microspheres.

BRIEF SUMMARY OF INVENTION

The present invention has been conceived and developed aiming to provide solutions to the above stated objective technical needs, as it will be evidenced in the following description. The present invention proposes solutions to the above enumerated shortcomings as detailed in the following:

In accordance with an aspect of the present invention is proposed a method of manufacturing a plurality of expanded microspheres by mixing a plurality of solid particles, at least one binding material capable of binding the plurality of solid particles, and a plurality of reactive expansion components into a batch, forming a plurality of agglomerated particles from the batch, heating the plurality of agglomerated particles in an expansion equipment to above a softening temperature of at least a portion of the plurality of agglomerated particles and activating the plurality of reactive expansion components, and forming a gas and expanding the plurality of agglomerated particles into the plurality of expanded microspheres, wherein the step of activating the plurality of reactive expansion components occurring independently from a chemical composition of the atmosphere surrounding the plurality of agglomerated particles inside the expansion equipment.

In accordance with another aspect of the present invention is proposed a plurality of expanded microspheres, each expanded microsphere comprising a structure comprising a plurality of walls and a surface layer, the plurality of walls defining a plurality of pores, the plurality of pores being enclosed in the expanded microsphere, and being substantially surrounded by the plurality of walls and the surface layer, the plurality of walls and the surface layer comprising a glass, and the glass comprising at least one of a sulfide and ferrous iron.

In accordance with a further aspect of the present invention is proposed a plurality of expanded microspheres, each expanded microsphere comprising a structure, the structure comprising a plurality of walls and a surface layer, the plurality of walls defining a plurality of closed pores and a plurality of open pores, and the surface layer enclosing the plurality of closed pores and the plurality of open pores within the expanded microsphere, the plurality of closed pores being completely surrounded by the plurality of walls, the plurality of open pores being surrounded partially by at least one of the plurality of walls and the surface layer, the plurality of walls and the surface layer comprising substantially a glass, and the surface layer comprising a plurality of micro-perforations, the glass comprising at least one of a sulfide and ferrous iron.

In accordance with a further yet aspect of the present invention is proposed a plurality of agglomerated particles, capable of being heated in an atmosphere surrounding the plurality of agglomerated particles, each of the plurality of agglomerated particles comprising a plurality of solid particles, at least one binding material capable of binding the plurality of solid particles, and a plurality of reactive expansion components, wherein the plurality of reactive expansion components when the plurality of agglomerated particles are heated, form a gas, the formation of the gas being independent from a chemical composition of the atmosphere surrounding the plurality of agglomerated particles.

In accordance with yet another aspect of the present invention is proposed a plurality of reactive expansion components used for making the plurality of expanded microspheres of the present invention.

In accordance with yet another aspect of the present invention is proposed a composite comprising a plurality of expanded microspheres in accordance with the present invention and a matrix enclosing the plurality of expanded microspheres.

In accordance with yet another aspect of the present invention is proposed a plurality of expanded microspheres manufactured in accordance with the methods of the present invention.

The solutions proposed by the present invention eliminate the effect of the furnace's atmosphere chemical composition, and in particular the effect of oxygen concentration and the oxygen concentration fluctuations on the expansion of a plurality of agglomerated particles en route to expanded into a plurality of expanded microspheres. As a result, a high yield in manufacturing of expanded microspheres that meet the target specifications with respect to particle density, pore structure, and particle size can be realized. In addition, expanded microspheres with specific pore configurations for specialized applications can be manufactured. The objective is achieved at least by incorporating a plurality of reactive expansion components in the plurality of agglomerated particles.

Further, the solutions proposed by the present invention disengage the mechanism of gas formation in the plurality of agglomerated particles from the oxygen concentration and oxygen concentration fluctuations within the combustion zone or within the overall furnace atmosphere. According to the method of the present invention expanded microspheres with consistent and reproducible physical and chemical specifications can be manufactured with significantly high yield due at least to the use of novel mixtures of reactive expansion components.

With the aid of the means and methods of the present invention, expanded microspheres having mixed open and closed porosity, with specific pore configurations can be obtained from a plurality of agglomerated particles.

The present invention also provides methods of reusing the very fine powders and dust particles created as byproducts during pulverizing and grinding of certain brittle materials, for example byproducts from pulverizing glasses that are used to manufacture hollow glass microspheres. According to the present invention, the fines and dust particles are used to form a plurality of agglomerated particles which are then processed into value added expanded microspheres.

The present invention further provides for methods of manufacture for microspheres with both open, closed, and mixed porosity that provide for the required consistent properties and performance.

More detailed explanations regarding these and other aspects and advantages of the invention are provided herewith in connection with the exemplary embodiments of the present invention.

BRIEF DESCRIPTION OF DRAWINGS

The above and other aspects, features and advantages of the present invention will become more apparent from the subsequent description thereof, presented in conjunction with the following drawings, wherein.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Reference will now be made to the drawings wherein like numerals refer to like parts throughout. As described herein below, the embodiments of the present invention provide at least for a plurality of agglomerated particles, a method of forming a plurality of agglomerated particles, a method of manufacturing a plurality of expanded microspheres, a plurality of expanded microspheres, reactive expansion components used for making the plurality of expanded microspheres, composites comprising at least one of a plurality of plurality of expanded microspheres, expanded microspheres made with the methods proposed by the invention, and equipment employed while making the expanded microspheres of the present invention.

In accordance with the present invention, by the term "atmosphere" is understood the gaseous environment inside an expansion furnace, that is either oxidizing, neutral or reducing, and that surrounds an agglomerated particle once said particle is introduced in the expansion furnace to form an expanded microsphere.

In accordance with the present invention, by the term "binding material" is understood a material that is capable of bonding a plurality of solid particles together within an agglomerated particle such that the plurality of agglomerated particles can be delivered to the expansion furnace and be subjected to a sudden temperature increase without being significantly fractured or fall apart. In addition, the binding material must be physically and chemically compatible with the plurality of the solid particles as will be discussed in the continuing sections.

"Reactive expansion components" or "RE components" are in accordance with the present invention chemical species capable of reacting to form a plurality of gasses.

In the present document the terms "expanded microparticles" is employed generically and refers to both spherical and non-spherical expanded particles including as well the expanded microspheres.

In the present document by the terms "expanded microsphere" or "microspheres" is understood a rounded expanded microparticle that is substantially spherical.

In the present document by the term "activation" is understood a phenomenon that implies the change of a plurality of components from a substantially inert or non-reactive state to a state in which the plurality of components are chemically and/or physically active. As it will be explained later in this document the activation is associated with either physical events and/or chemical reactions.

In the present document by the term "pore" or "porosity" is understood a chamber (e.g. a void, a cell, a cavity) of a measurable size located within a microsphere. The pore may be an open pore, a chamber within the interior volume of the microsphere that is in connection with either other open pores via an opening in the walls surrounding the space or with the outside of the microsphere via an opening in the surface layer or outer skin or outer layer of the microsphere. Therefore, an open pore is a pore that communicates with the neighboring pores and/or with the outside. The pore may also be a closed pore, referring to a chamber located within the microsphere that may comprise a plurality of gases other than air and is not in communication with other pores or with the space outside the microsphere. Therefore, a closed pore is a pore that is substantially isolated or enclosed by a plurality of walls or by a plurality of walls and the outer skin. On the other hand, an open pore is partially enclosed by a plurality of walls and/or by the outer skin. The plurality of walls and the outer skin may be formed from all glass or glass and non-glass materials. The internal space of the microsphere is enveloped in the outer skin. The outer skin may be substantially sealed or may have openings that allow communication of fluids from outside to the interior space of the microsphere or vice-versa. Fluids in this case refer to gases (including air), and liquids.

In this document the terms "agglomerated particles" and "granulated particles", and the terms "microspheres" and "microparticles", have been used in alternative and interchangeably.

Figure 1:
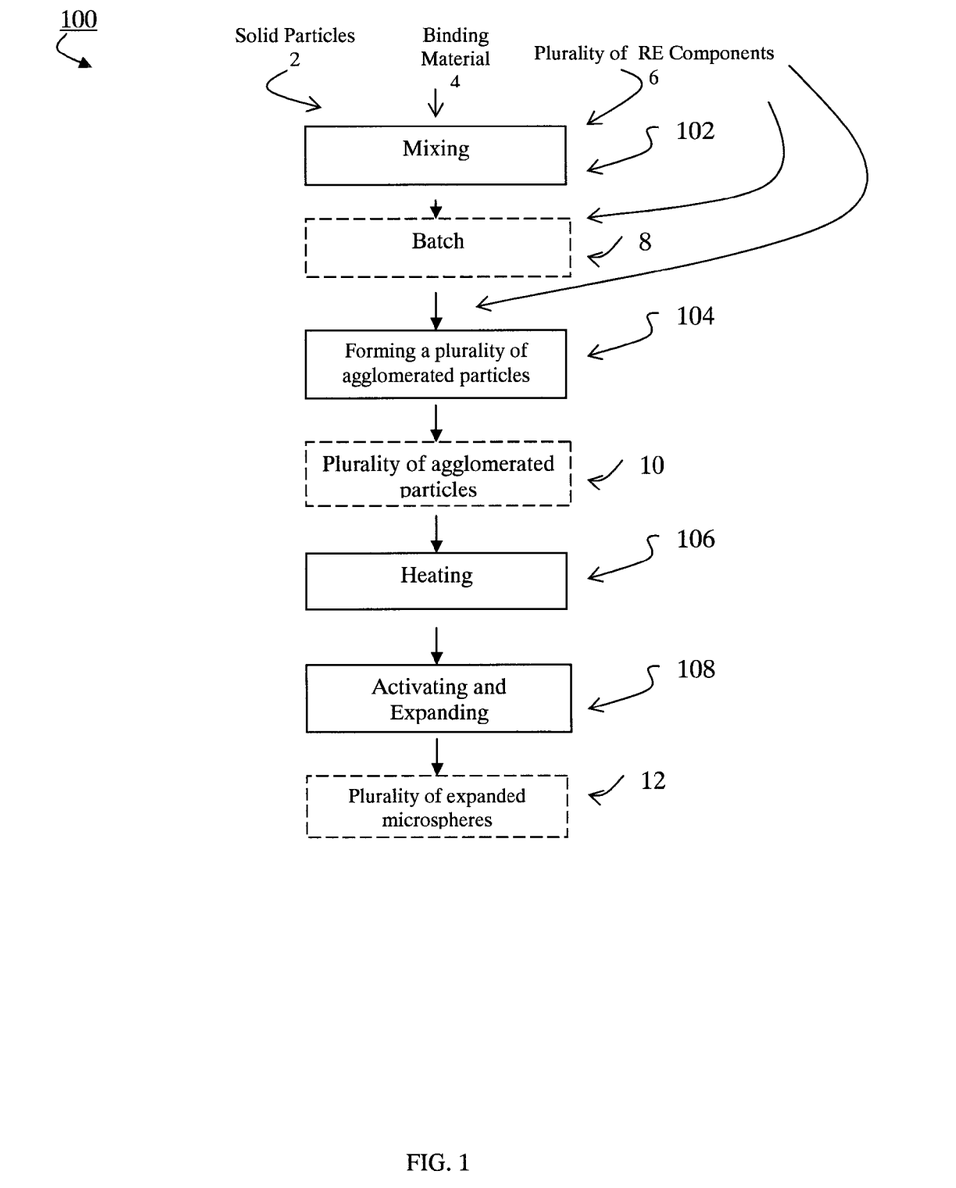
FIG. 1 is a flow-chart diagram of a method for manufacturing a plurality of expanded microspheres in accordance with one embodiment of the present invention.

The present invention will now be described in connection with the figures. FIG. 1 is a flow-chart diagram of a method for manufacturing a plurality of expanded glass microspheres in accordance with an embodiment of the present invention.

While describing the method 100 of manufacturing expanded glass microspheres, reference will be made to FIG. 1 that illustrates with solid boxes the steps of method 100 and with boxes bordered with interrupted lines the byproducts of those steps.

In accordance with one embodiment of method 100 solid particles 2, at least a binding material 4 and a plurality of reactive expansion components (RE components) 6 are brought together and mixed or blended in a step 102 to form a batch 8 that can take the form of at least a slurry, a paste or a mixture. The step of 102 may be performed at temperatures from about room temperature to elevated temperatures, and/or under atmospheric or under hydrothermal conditions.

The solid particles 2 comprise at least one of a plurality of raw materials, a plurality of recovered materials, and a plurality of additives, and a combination thereof. All or the majority of the solids particles 2 comprise fine powders, preferably having an average diameter of less than 1000 microns. The average diameter of the solid particles 2 may be selected from a range of several nanometers to several hundred microns, preferably from several nanometers to less than 100 microns, and most preferably from several nanometers to about 20 microns. The particle size distribution of the solid particles 2 is selected such that the solid particles forming the plurality of the agglomerated particles 10 have preferably a packing factor greater than 40%. The packing factor is chosen depending on the desired porosity configuration of the plurality of expanded microspheres that will be manufactured with method 100.

In one embodiment of the present invention, the solid particles 2 are added to the batch 8. In accordance with another embodiment of the present invention, the solid particles 2 may comprise a solid binder.

In accordance with another embodiment of the present invention, a plurality of RE components 6 may be added to the solid particles 2 in solid form or the solid particles 2 may intrinsically comprise the plurality of RE components 6. In accordance with yet another embodiment of the invention, the solid particles 2 comprise a mixture of solid particles, solid binder, and solid RE components or equally the solid particles 2 comprise the plurality of RE components 6 and a solid binder.

The at least one binding material 4 may be either in the form of a solid or a liquid and is a substance that is capable of binding the solid particles 2 together to form the plurality of agglomerated particles 10. Although in accordance with an embodiment of the present invention it is envisioned that the binders may be solid, in accordance with another embodiment of the invention the binder may be liquid. The at least one liquid binding material 4 comprises at least one of an aqueous solution, water, an emulsion, a slurry, a viscous liquid, a paste, a bonding agent, a liquid containing at least an inorganic material, a liquid containing at least an organic material, and a combination thereof.

After the mixing step 102 the interstitial space between the solid particles 2 is normally taken up (e.g. filled or partially filled) by the binding material 4.

The plurality of RE components 6 comprises a combination of at least one oxidizing and at least one reducing chemical species. A part of or all of the plurality of RE components 6 may be included in the at least one binding material 4, and/or the solid particles 2. Optionally, part or all of the plurality of RE components may be added directly to the batch 8 during the mixing step 102. According to one embodiment of the present invention, the plurality of RE components 6 may be added to the batch 8 in solid form, liquid form, gaseous form, or a combination thereof. For example, a portion or all of the plurality of RE components 6 may be occluded in the solid particles 2. Similarly, a portion or all of the plurality of RE components 6 may be included in the liquid or binder materials 4 that is used to bind the solid particles 2 together in the plurality of agglomerated particles 10.

In another example, a part of the plurality of RE components 6 may be included in one portion of the solid particles 2 (i.e. first portion) and another part of the plurality of RE components 6 may be occluded in another portion of the solid particles 2 (i.e. second portion).

The solid particles 2 comprise at least one of a plurality of raw materials, a plurality of recovered materials, and a plurality of additives, and a combination thereof. The plurality of raw materials comprise at least one of a siliceous material, a silicate containing material, an aluminum containing material, an alumina silicate containing material, a boron containing material, a phosphorus containing material, a transition metal containing material, a titanium containing material, an alkaline metal containing material, an alkaline earth metal containing material, an alkaline metal oxide containing material, an alkaline earth metal oxide containing material and a combination thereof. Generally all raw materials used in melting commercial and specialty glasses are included in the above category.

The plurality of recovered materials comprise at least one of a waste glass, a silicate glass, a soda lime glass, a borosilicate glass, a ceramic, an industrial waste byproduct, a consumer waste byproduct, flyash, bottom ash, incineration ash, a slag, a vitrified waste or hazardous material, mine tailings, red mud, a cement containing material, building materials waste and reuse, a biomass, and a combination thereof.

The plurality of additives comprises at least one of a fluxing agent, a rheology modifier, a retarding agent, an accelerating agent, a suspension stabilizing agent, a dry binding agent, a coloring agent, a physical property altering agent, a chemical property altering agent, and a combination thereof.

The plurality of solid particles 2, at least one binding material 4, and the plurality of RE components 6 are mixed or blended together in step 102 to form the batch 8.

The plurality of RE components 6 may be added all at once to the batch 8 or its components may be added in a sequential order or a non-sequential order after the batch 8 is mixed. As mentioned previously, the plurality of RE components 6 may be included intrinsically, or integrally with the solid particles 2, with the at least one binding materials 4, or can be added separately to the batch 8. This includes natural or artificial inclusion of the plurality of RE components 6 in the solid particles 2 (as a part of the raw materials, recovered materials, and additives), and natural or artificial inclusion in the binding materials 4. For example, a first portion of the plurality of RE components 6 may be partially or fully included in the binding materials 4 resulting in the placement of the plurality of RE components 6 between the solid particles 2 in the plurality of agglomerated particles 10. A second portion of the RE components 6 are is included in the solid particles 2. The first portion of the plurality of RE components by design can be activated before or after or simultaneously when the second portion activates. The activations may be selected to be dependent or independent from each other. For example, activation of the first portion can trigger the activation of the second portion and vice-versa. For instance, a first portion of the plurality of RE components 6 can be added directly to the batch 8, and a second portion of the plurality of RE components 6 can be added after the batch 8 has been mixed but prior to the batch 8 entering the agglomeration equipment. More than one portion of the plurality of RE components 6 may be added sequentially at different locations within the sequence of steps 102 and 104, upstream from the step 104 of forming a plurality of agglomerated particles 110 using the agglomeration equipment. The agglomeration equipment carries out the forming step 104 by at least one of compaction, pressing, slugging, fluidization, tumbling, mixing, centrifugation, oscillation, compression, extrusion, roller pressing, pellet milling, wet/moist granulation, melt granulation, stream granulation, moist granulation, thermal adhesion granulation, foam granulation, and drying. One reason for the sequential addition of the plurality of RE components 6 is to prevent or minimize the premature activation of the plurality of RE components 6 in some special cases which may result in the premature formation of gas in the batch 8 or excessive gas formation in the plurality of agglomerated particles 10. However, in other embodiments, a pre-reaction between the components of the plurality of RE components 6 is allowed and in fact may be promoted as long as the creation of gas is not an issue or can be handled without any negative side effects. In some embodiments, it may be necessary to promote pre-reaction or pre-transformation of the plurality of RE components 6 into reaction products or transformation products (such as a decomposition product) while the materials comprised in the batch 8 are processed into the plurality of agglomerated particles 10. In these cases the plurality of RE components 6 are selected such that degassing would not occur, or if it did, it can be handled in the agglomerating equipment without any negative results. In yet another embodiment, it may be desirable to have the pre-reaction or pre-transformation of the plurality of RE components 6 to take place not in the batch material 8, but during the agglomeration process. For example, when agglomeration is carried out in a spray dryer, pre-reactions may be allowed to occur while the batch material 8 is being spray dried. In such embodiments the reaction products or transformation products of the plurality of RE components 6, will further activate in the expansion furnace to form the volume and type of gas necessary to expand the plurality of agglomerated particles 10 into the plurality of expanded microspheres 12. The activation in the agglomerating equipment occurs at significantly lower temperature than the activation in the expansion furnace. In both cases, the activation of the plurality of RE components occurs independently from the atmosphere of the agglomerating equipment and the atmosphere of the expansion furnace. Thus it is possible in some cases to pre-activate a portion of the plurality of the RE components in the agglomeration equipment.

The materials comprised by the batch 8 may be in a dry, slurry, a liquid, or a paste form. Irrespective of its form, the batch 8 is processed in step 104 into the plurality of agglomerated particles 10 by agglomerating or granulating the batch material 8 in an appropriate agglomerator or granulator. In the case of slurries or liquid batches the agglomeration may be accomplished by drying. In the case of processing a dry batch, the mixture is granulated by conventional granulating methods such as compaction/pressing or slugging the mixture, followed by size reduction and screening of the resulting granulated solid particles to a predetermined average particle size, and particle size distribution. In most cases the average particle size of the plurality of agglomerated particles is less than 1000 microns, preferably less than 500 microns. The particle size distribution of the plurality of agglomerated particles to a very good extent depends on the type and operational parameters of the agglomerator. A very wide particle size distribution is not desired. In most cases the requirement for the average particle size, and particle size distribution of the plurality of expanded microspheres dictates how to set the controls and operate the agglomerating equipment for the closest outcome to the desired values. In the case of processing a slurry or a paste, the mixture is granulated by conventional wet or semi-wet granulation methods such as granulation in fluidized bed granulators, or in tumbling drums/pans/pot granulators, or in disc granulators, mixer granulators, centrifugal granulators, oscillation granulators, and compression type granulators. The latter includes granulators that may involve the process steps of extrusion, roller pressing, pellet milling, and other similar compression type processing steps. In addition, according to the present invention, wet/moist granulation may include melt granulation, stream granulation, moist granulation, thermal adhesion granulation, foam granulation, and other known techniques for granulating. The wet granules of the batch 8 can be dried in a variety of dryers including a fluidized bed dryer, a dry dryer, a rotary dryer, a rolling bed dryer, and such.

In accordance with one embodiment of the present invention, the batch 8 is processed in step 104 using a spray dryer to form the plurality of agglomerated particles 10. Spray drying is a widely used industrial process for agglomerated particle formation and drying. According to the present invention, a spray dryer lends itself well for the continuous production of agglomerated particles 10, when the batch 8 is in slurry form.

According to the present invention, the plurality of RE components 6 in the agglomerated particles 10 comprises at least one of an oxidizing and a reducing chemical species. The terms "agglomerated particles" and "granulated particles" are used interchangeably in this document and refer to a composite particle that comprises at least a plurality of solid particles 2 bonded together with at least one binding material 4, and a plurality of RE components 6, the plurality of reactive expansion components forming a gas when the plurality of agglomerated particles are heated, the formation of the gas being independent from a chemical composition of an atmosphere surrounding the plurality of agglomerated particles. The plurality of RE components 6 in the plurality of agglomerated particles 10 is activated to form gas at least by one of a chemical reaction and an event. The event is a physical phenomenon that includes evaporation, dehydration, boil-off, sublimation, and saturation or any other physical events that result in a change in the plurality of RE components 6, with or without formation of gas.

The plurality of RE components 6 may remain intact, transform, and/or react while in the batch 8, or when the batch 8 is processed into the plurality of agglomerated particles 10. However, regardless of any pre-reaction and/or pre-transformation that may take place while residing in the batch 8, the plurality of RE components 6 or their byproducts (formed in during pre-reaction and/or pre-transformation) comprises at least one oxidizing and one reducing chemical component when included in the plurality of agglomerated particles 10. In certain cases, when one or more individual components of the plurality of RE components 6 has the potential to be activated prematurely in contact with a wet batch 8, that component may be held off from being added to the batch 8 until right prior to the time that the batch 8 enters the agglomerator in step 104, where it loses its water rapidly, for example by evaporation. In such cases, the water sensitive component is introduced into the feed line feeding the slurry batch 8 right before entering the agglomerator. In this way, the contact time between the water sensitive component and water is short, and the corresponding reaction(s) and/or transformation(s) do not proceed significantly because water/moisture is removed from the batch 8 in step 104 while the batch is processed into a plurality of agglomerated particles 10.

The plurality of RE components 6 may be introduced into the batch 8 separately, or as a part of solid particles 2, or as part of binding materials 4, or a combination thereof. As mentioned previously raw materials, recovered materials, and additives in solid forms are all considered to be parts of the plurality of solid particles 2. The at least one binding material 4 on the other hand comprises any liquid, melt, and non-solid portions of the batch 8. It is possible that either one of raw materials, recovered materials, and additives is added initially as solids to the batch 8, but they may partially or fully dissolve or break apart in the batch 8. As mentioned previously, the batch 8 may be in the form of slurry, and a paste, and comprises solid particles 2.

In one embodiment of the present invention, the solid particles 2 are in the form of very fine particles created as a side stream byproduct from pulverizing glass, ceramics, minerals, ores, rocks and alike. One example is the fines created during pulverizing glass for the production of hollow glass microspheres or glass balloons. In most cases, the fines recovered from side streams are considered rejects, and are normally recycled back into the process, or are land filled. Recycling presents difficult challenges because of the very fine nature of the powders that can be easily airborne, causing dusting, and packing or clogging of feeding systems, to mention just a few problems. Some of the fines, like those recovered from pulverizing glass, may contain useful RE components 6 such as sulfates and other oxidizing and reducing compounds. It has been found that the fines can be used as solid particles 2 in forming the plurality of agglomerated particles 10.

According to one embodiment of the present invention, the fines containing sulfates are blended with an appropriate binding material 4, and the mixture is agglomerated to form the plurality of the agglomerated particles 10. The binder material 4 may be doped with a plurality of RE components such as appropriate reducing agents, for example carbon, hydrocarbons, organics, sugar, sulfides, nitrides, etc. The oxidizing sulfate contained in the glass particles 2, and the reducing agent in the binder material 4 already satisfy the requirements for the presence of the necessary plurality of RE components 6, as these components are already contained in materials 2 and 4 in this case. The resulting plurality of expanded microspheres 12 has a mixture of closed pores, primarily due to the formation of $SO_2$ gas in the areas where the glass particles were located, and mostly open pores, due to formation of $CO_2$ where the binding material 4 was concentrated. According to the example given above, it is possible to predetermine the approximate fraction of closed and open pores by increasing or decreasing the volume fraction of the binding material 4 in the plurality of agglomerated particles 10, and also by increasing or decreasing the amount of the plurality of RE components 6 in the binding material 4, and adjusting the type of the plurality of RE components 6 in the binder material 4. It is also possible to effect that the resulting microspheres 12 do not have a significant fraction of open porosities by not including RE components 6 in the binding material 4, but to pre-coat the solid particles 2 with an appropriate reducing agent to balance the amount of oxidizing sulfate being contained in the solid particles 2. Balancing in this case means for every two moles of $SO_3$ (from $SO_4$), at least one atom of carbon may be included in the plurality of RE components 6 to satisfy the stoichiometric ratio of the following reaction:

$$2SO_3+C \Rightarrow 2SO_2+CO_2 \tag{1}$$

In one embodiment of the present invention, the RE components 6 comprise carbon. Carbon, such as carbon black, is dispersed uniformly in a solution containing dispersants and optionally stabilizers to form a carbon black liquid stock, before being added to batch 8. The carbon black is considered a RE component 6 with reducing properties. In addition, the RE components 6 comprise sulfates in the form of alkali metal sulfates and/or alkaline earth metal sulfates. Sulfate is a RE component 6 with oxidizing properties. In this particular example, the carbon black slurry at a predetermined amount is added to the batch 8 upstream from step 102, or during step 102 while the batch 8 is being prepared, or downstream from step 102, for example by injection into a pipe carrying the batch 8 to the agglomerating equipment. The injection may be carried out via a high intensity inline mixer at a predetermined mass rate relative to the mass flow of the batch 8 as being transferred to the agglomerating equipment. Instead of carbon black slurry, other carbon containing compounds such as hydrocarbons, sugars, carbides, graphite, activated carbon, glycerin, oils, finely ground anthracite, and carbon as a reaction byproduct of pyrolysis organic molecules may be used.

In accordance with other embodiments of the present invention, one or more compounds selected from the group of non-volatile water soluble organic compounds such as sugars, starches, organic anions, carboxylic acids, carbonyls, carbohydrates, amino acids, aliphatic amines, urea, compounds containing multiple hydroxyl, carboxyl, carbonyl groups are added to the batch 8 as constituting the RE components 6. These organics, as a part of the plurality of RE components 6 form finely dispersed carbon particles for example by pyrolysis during the heating step 104 while the plurality of agglomerated particles is being heated in a step 106 in a furnace. The carbon reacts with the sulfate to form carbon dioxide and sulfur dioxide gaseous products, capable of expanding the plurality of softened agglomerated particles 10 into the plurality of plurality of expanded microspheres 12. A redox reaction between carbon and sulfate takes place independently from the oxygen content of the furnace atmosphere. Therefore, the particle expansion process is independent from the oxygen content of the furnace atmosphere, and as mentioned previously, the expansion process is disengaged from the chemical composition of the furnace's atmosphere.

In other embodiments of the present invention, one or more compounds selected from the group of alkali-refined oils, water miscible oils, water soluble oil soaps, and similar materials are used to produce carbon upon heating the plurality of agglomerated particles 10.

In yet another embodiment, the plurality of RE components 6 comprises at least one of a sulfide and a sulfate (sulfate is assumed to be interchangeable with sulfite in most cases). The sulfate may be selected from an alkali metal sulfate, an alkaline metal sulfate, or a transition metal sulfate. The reaction between sulfide and sulfate produces sulfur dioxide gas, independent from the oxygen concentration in the furnace atmosphere according to the following reaction:

$$3SO_4^{2-}+S^{2-} \leftrightarrow 4SO_2+4O^{2-} \tag{2}$$

In another embodiment of the present invention, a gaseous RE component 6, such as hydrogen sulfide, may be injected into the batch 8 upstream prior to the agglomeration step 104. Hydrogen sulfide pre-reacts with a metal ion present in the batch 8 to produce a metal sulfide which in this case is considered a reaction product. The metal sulfide in turn reacts at high temperature with sulfate to form sulfur dioxide. The reaction of sulfide and sulfate, or reaction of carbon with sulfate, are considered chemical reactions that are activated to produce gas when the plurality of agglomerated particles 10 is heated in the furnace. According to the present invention, the rate of redox reactions responsible to produce gas to expand the plurality of agglomerated particles is temperature dependent, and has higher rates at temperatures above 600° C. than at room temperature. The agglomerated particles 10 are subjected to a heating or firing step 106 in firing equipment, such as a furnace.

In some cases iron compounds are introduced into the batch 8 as impurities contained in either one of raw materials, recovered materials, additives, and binding materials. Iron may be in the form of ferrous or ferric iron, or in the form of magnetite ($Fe_3O_4$). In other cases, iron compounds may be added directly to the batch 8. Ferric/ferrous iron compounds are considered as RE components 6. Ferric iron is considered as an oxidizer, since it can release oxygen in converting to ferrous iron. When ferric iron is present in the plurality of agglomerated particles 10, it is considered a part of the oxidizing components of the plurality of RE components 6. Ferric iron after losing oxygen, converts to ferrous iron. The redox reaction involving reduction of ferric to ferrous iron occurs within the agglomerated particles during the expansion process in the furnace, the oxygen reacts with a reducing component of the plurality of RE components, for example carbon, and produces a gas (e.g. CO and/or CO2). The gas expands the softened agglomerated particles into the plurality of expanded microspheres 12. Traces of ferrous iron in the glass portion of the plurality of expanded microspheres 12 can be measured and used to verify that the redox reactions have indeed occurred in the plurality of expanded microspheres 12. Hence, the traces of ferrous iron indicate the self sufficiency of providing expansion gases within the agglomerated particles en route to expanding into the plurality of expanded microspheres independent from the furnace oxygen concentration/content. The same applies to the reduction of sulfate which is considered an oxidizing component of the plurality of RE components in providing oxygen for example to oxidize a reducing component such as carbon, or a sulfide material. In the process gases of carbon oxides are produced when carbon is present, plus sulfur dioxide and possibly hydrogen sulfide, when traces of water might be present. In this case trace quantities of sulfide may appear in the glass portion of the plurality of expanded microspheres 12. Consequently, sulfide and ferrous iron will be present in the plurality of expanded microspheres 12, indicating that redox reactions according to the present invention have taken place within the agglomerated particles 10 inside the expansion furnace en-route to manufacturing the plurality of expanded microspheres 12.

According to one aspect of the invention, the plurality of agglomerated particles 10 while suspended in the furnace atmosphere are heated to soften or melt at least a portion of the plurality of agglomerated particles 10, activating the RE components, and expanding them into a plurality of expanded microspheres 12. Heating in the furnace is provided by various means such as by combustion of a fossil fuel, resistive heating, convective heating, microwave heating, arc heating, IR heating, electrical heating, inductive heating, plasma heating, or a combination thereof. A preferred type of furnace according to the present invention is a vertical expansion furnace with upward or downward flow patterns. Other heating devices, such as rotary kilns, moving beds, and various fluidizing heating devices, are as well within the scope of the present invention. As an example, in step 106, the plurality of agglomerated solid particles 10 are heated rapidly in a combustion zone of the furnace to temperatures in excess of 800° C., normally to around 1500° C. in very short time (e.g. from a fraction of a second to several seconds). In the process, the plurality of agglomerated particles 10 are softened, and the plurality of RE components 6 are activated to produce gas. The gas produced is substantially entrapped in the softened plurality of agglomerated particles 10, causing the plurality of agglomerated particles 10 to expand into the plurality of expanded microspheres 12. The resulting microspheres 12 are rapidly cooled to room temperature, normally by introducing a large volume of cooling air near the exit section of the furnace. The resulting expanded microspheres 12 generally have an internal pore configuration comprising at least one of closed and open porosity. In accordance with one embodiment of the present invention, the plurality of agglomerated particles 10, comprising the solid particles 2, the binding material 4, and the plurality of RE components 6 may be all included in the particles 2, or in the binding material 4, or be divided between the two. Upon heating the plurality of agglomerated particles 10, the RE components 6 are activated, producing gas, and causing the plurality of agglomerated particles 10 to expand into the plurality of the expanded microspheres 12.

As an exemplary embodiment of the present invention, a finely divided plurality of solid particles 2 comprising silicate materials, a binding material 4 comprising a water soluble alkali silicate, fumed silica (that may be substituted with silica gel, finely ground silica, or finely ground kaolin) and a plurality of RE components 6 comprising a sulfate compound, and blackstrap molasses are combined to form the batch 8. Molasses is a source of carbon. The batch composition on oxide basis falls within the range of 30-80% $SiO_2$, 3-20% of $R_2O$ ($R_2O$ is one or combination of $Li_2O$, $Na_2O$, $K_2O$), 1-30% $Al_2O_3$, 0.5-30% RO (RO is one or a combination of MgO, CaO, SrO, BaO), and 0.5-30% of other oxides and chemical species such as $B_2O_3$, $TiO_2$, $P_2O_5$, $SO_4$, C, etc.

In step 102 the batch 8 is blended into a slurry. The additives are as well added to the batch such as a fluxing material such as sodium hydroxide, a flow aid such as a soap, a chemical compound such as calcium hydroxide, a recycled material such as pulverized borosilicate glass, and a waste byproduct such as flyash. As a part of the plurality of RE components 6, in addition to or instead of molasses, a carbonaceous fluid containing a fine dispersion of graphite in water can be injected into the batch before processing the slurry in step 104 in a spray dryer to form the plurality of agglomerated particles 10. Molasses partially goes through pyrolysis while in the spray dryer forming carbon containing fine particles dispersed evenly in the binder portion of the plurality of agglomerated particles 10. As an alternative or in addition to the carbonaceous fluid, a sulfide can be added to the batch, for example a slurry of iron sulfide. In step 106, the plurality of agglomerated particles 10 are heated to temperatures above 800° C. to soften at least a portion of the agglomerated particles 10, and activate the plurality of RE components 6, which react and produce $SO_2$, and $CO_2$ gas, which are entrained/entrapped in the softened agglomerated particles 10, causing them to expand into the plurality of expanded microspheres 12. In this case the activation of the plurality of RE components 6 results in the following reaction that produces carbon dioxide and sulfur oxide, whist all the oxygen is supplied in-situ by the sulfate:

$$C\text{(from carbonaceous fluid)} + 2SO_3\text{(from sulfate)} \Rightarrow CO_2 + 2SO_2 \quad (3)$$

As shown above, the plurality of reactive expansion components is transformed into a plurality of secondary reactive expansion components prior to expanding the plurality of agglomerated particles into the plurality of expanded microspheres, the plurality of reactive expansion components and the secondary plurality of reactive expansion components being distinct from each other. Also as described above, at least in connection with the method 100, the plurality of agglomerated particles are heated to a temperature at which a melt is formed, and the plurality of RE components 6 is activated to produce one or more gaseous products. The plurality of expanded microspheres is formed at least by entrapping the gaseous product in the melt, gaseous product that expands the microspheres. The plurality of expanded microspheres are cooled to room temperature. The step of heating the plurality of agglomerated particles 104 is preferably carried out in a furnace while the plurality of agglomerated particles 104 are suspended within a furnace atmosphere.

The plurality of RE components 6 may be added to the batch 8 in solid form, liquid form, gaseous form, or a combination thereof. The activation of the plurality of RE components 6 is triggered by at least one of a physical event, and/or a chemical reaction. The physical event and the chemical reaction are initiated by at least one of heating, changing pressure, wetting, and by contacting with one or more constituents of the batch. In most cases the activation rate of the plurality of RE components 6 is temperature dependent. The activation of the plurality of RE components 6 is independent from the chemical composition of the furnace atmosphere and in particular is independent from the oxygen content in the furnace atmosphere that surrounds the agglomerated particles during the heating process. Oxygen content, oxygen concentration, oxygen partial pressure, and oxygen fugacity may be used interchangeably, as they are all related. According to the present invention, it has been found that depending on where the placement of the plurality of RE components 6 occurs, e.g. either in the solid particles 2 and/or the binding materials 4 portion of the batch 8, open and/or closed porosities are achieved in the plurality of expanded microspheres 12. Generally, the plurality of RE components 6 occluded in the solid particles 2 of the batch leads to the formation of mostly closed porosity in the plurality of expanded microspheres 12, whereas the inclusion of the plurality of RE components 6 in the binding material 4 of the batch 8 results in mostly open and interconnected porosities. Hence not only is possible to predetermine the type of porosities in the final product, i.e. open, and/or close, but also the volume fraction of each type of porosity, and the average particle density of the plurality of expanded microspheres can also be estimated.

The plurality of expanded microspheres 12 according to the present invention comprises a gas or a mixture of gases surrounded completely and/or partially by a plurality of solid walls. The plurality of solid walls comprises either all glass or mixtures of glass with non-glass materials. The plurality of solid walls contains at least one of a sulfide and ferrous iron.

According to the present invention, the plurality of agglomerated particles 10 comprising the plurality of RE components 6 when heated in an appropriate thermal device such as a furnace expand due to formation and entrapment of gas. Gas is formed due to the activation of the plurality of RE components 6, and such activation is associated with at least one of a physical event such as saturation, dehydration, evaporation, sublimation, and chemical reactions such as recombination, redox reactions, chemical decomposition, and chemical dissociation. In order for the plurality of agglomerated particles 10 to expand, at least a portion of the agglomerated particles should be at a softened or molten state while the gas is being formed. According to the present invention, a softening and melting state is identified by a viscosity in the range of about 10 to 10,000,000 poise. Preferably the softened or molten portion of the agglomerated particles is one of a material that can form a glass phase or is a glass material. The gas created by the activation of the plurality of RE components 6 is at least partially trapped by the plurality of heated agglomerated particles primarily 10 within the glass phase of the plurality of heated agglomerated particles 10, thereby forming a plurality of expanded micro particles 12 preferably in the shape of microspheres. Upon cooling the newly formed plurality of expanded micro particles 12 the softened glass phase solidifies and the expanded structure freezes in. The plurality of expanded microspheres 12 may comprise either one of a multi-pore structure or substantially a single pore structure, in which the pore space is enveloped by a glass wall. In a multi-pore (or multi-cell) configuration, a plurality of cells is arranged next to each other. The glass wall may be formed from substantially all glass, or glass combined with non-glass materials. The pore configuration of the plurality of expanded microspheres which include volume fractions of open and closed porosities, average pore size, and total pore volume can be controlled according to the type, amount and placement of the plurality of RE components in the constituents of the batch, as mentioned previously.

For example, a portion or all of the plurality of RE components 6 may be occluded in the solid particles 2. Similarly, a portion or all of the plurality of RE components 6 may be occluded in the liquid or binding material 4 that is used to bind the solid particles 2 together to form the plurality of agglomerated particles 10.

In another example, a part of the plurality of RE components 6 may be occluded in one portion of the solid particles 4 (i.e. first portion) and another part of the plurality of RE components 6 may be occluded in another portion of the solid particles 4 (i.e. second portion). For example, the first portion of solid particles 4 comprises the raw materials, and the second portion comprises the recovered materials and/or the additives.

Other factors that influence the pore configuration of the plurality of expanded microspheres 12 are: composition, particle size and particle size distribution of the solid particles 2 making-up the solid portion of the plurality of agglomerated particles 10; composition and volume fraction (with respect to the volume of the solid particles 2) of the binding phase 4 used to produce the plurality of agglomerated particles 10, temperature and residence time of the plurality of agglomerated particles 10 in the furnace (also referred to as the firing furnace or the expansion furnace); method of heating, e.g. heating by combusting a fossil fuel or heating by means of electricity (includes resistive, convective, microwave, plasma, arc, IR, and inductive heating).

By melting the plurality of agglomerated particles 10 it is meant that at least a portion of an agglomerated particle 10 is softened or melted. This includes softening or melting the binding material, and/or softening or melting the solid particles 4. The activation of the plurality of RE components 6 according to the present invention is independent from the chemical composition of the furnace atmosphere that is present in the furnace during the heating of the plurality of agglomerated particles 10. According to the present invention, the activation of the plurality of RE components 6 is independent from the oxygen content or oxygen partial pressure present in the furnace atmosphere.

Figure 2A:
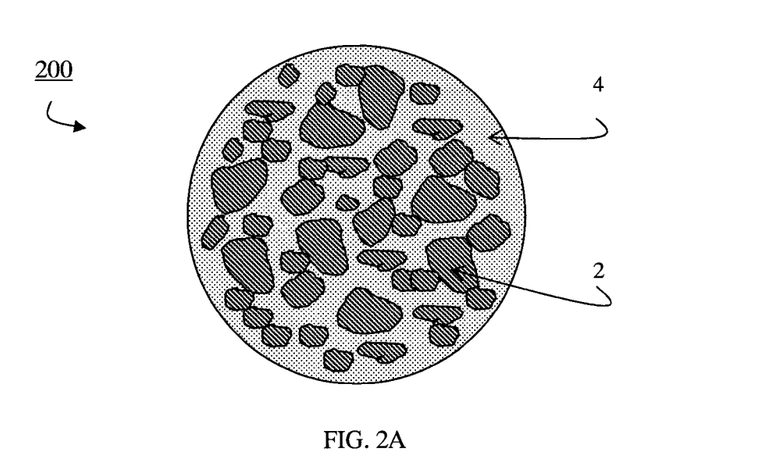
FIG. 2A is a cross-section representation of an agglomerated particle in accordance with one embodiment of the present invention.
Figure 2B:
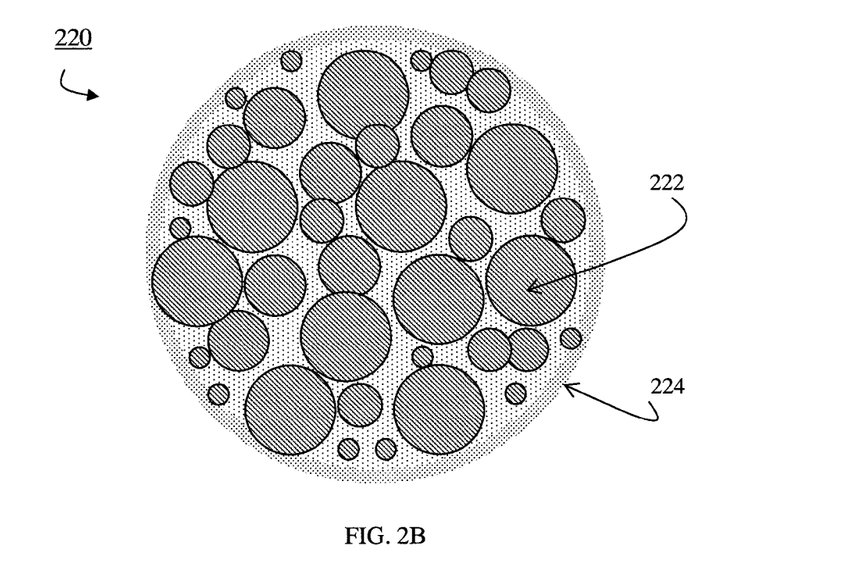
FIG. 2B is a cross-section representation of an expanded microsphere in accordance with one embodiment of the present invention.

FIG. 2A is a cross-section representation of an agglomerated particle 200 in accordance with one embodiment of the present invention, and FIG. 2B is a cross-section representation of an expanded microsphere 220 in accordance with the one embodiment of the present invention.

As schematically illustrated in FIG. 2A, the solid particles 2 and the binding material 4 have been agglomerated to form an agglomerated particle 200 illustrated in FIG. 2A. The plurality of RE components are not distinctly illustrated as part of the agglomerated particle 200 as they may be, as discussed in connection with various embodiments of the present invention mentioned earlier in this document, either integral with the solids 2 and/or integral with the binder 4 and/or added separately to the batch 8. Upon heating the agglomerated particle 200 and due to heating, the plurality of RE components 6 are activated and gas will form. At the same time, the binding material 4 and/or the solid particles 2 will soften/melt, combining to form a substantially viscous glassy material. As schematically illustrated in FIG. 2B, and as a result of heating the agglomerated particle and the activation of the plurality of RE components 6, pores 222 (also referred to as cells, gas pockets or cavities) are formed and surrounded by the viscous glassy material. Pores 222 comprise closed pores, and open pores. Pores 222 can also communicate with each other. The reactions responsible for creating gas are independent from the oxygen concentration in the furnace atmosphere, leading to the formation of the expanded microsphere 220. In a preferred outcome, the glassy material is substantially a homogenous glass originated from melting the solid particles 2 and the binding material 4 together during the heating process in the furnace. In the preferred outcome, all the pores are substantially isolated from the outside by a glassy solid outer layer or a glassy outer skin 224 or surface layer 224. The pore wall thickness and the thickness of the outer skin are the dominating factors affecting the particle density of the resulting plurality of expanded microspheres 220. According to the present invention, particle densities from 0.08 g/cc to greater than 1 g/cc can be manufactured using the plurality of RE components 6 in combination with the plurality of agglomerated particles 10. Average particle size for the plurality of the expanded microspheres 220 is in the range of about 10 microns to greater than 1000 microns. The outer skin or surface layer 224 seals the inner pore structure of the plurality of expanded microspheres from the outside. The thickness of the outer skin 224 is selected primarily based on the desired mechanical properties of the plurality of expanded microspheres 220. A thicker outer skin 224 is correlated with a higher crushing strength and a higher particle density of the plurality of expanded microspheres 220. The crushing strength is determined under ASTM D3102-78 Standard Practice for the "Determination of Isostatic Collapse Strength of Hollow Glass Microspheres". According to the present invention, an average particle density of about 0.15 g/cc provides for a crushing strength of about 200 psi and higher, and 2000 psi or higher for an average particle density of about 0.3 to 0.4 g/cc.

Therefore as illustrated in FIG. 2B, each expanded microsphere comprises a structure comprising a plurality of walls and a surface layer, the plurality of walls defining a plurality of pores, the plurality of pores being enclosed in the expanded microsphere, and being substantially surrounded by the plurality of walls and the surface layer. The plurality of walls and the surface layer comprise substantially a glass, and the glass comprises at least one of a sulfide and ferrous iron. The average thickness of the surface layer 224 and the average thickness of the plurality of walls may vary from several microns to tenths of microns, for example, from an average thickness of 1 micron to 20 microns. The typical crushing strength of the plurality of expanded microspheres 220 is greater than 100 psi, and preferably greater than 1000 psi for an average particle density of 0.2 g/cc.

Figure 3:
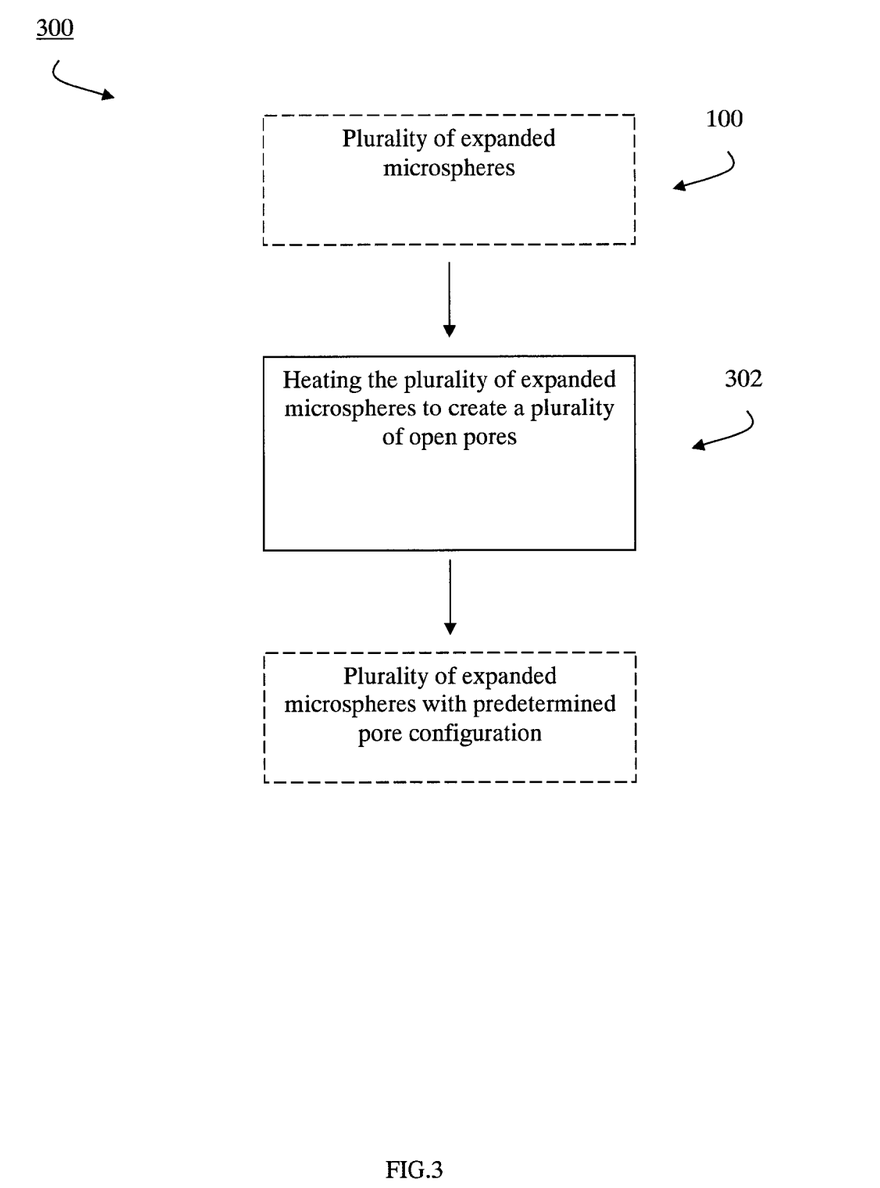
FIG. 3 is a flow-chart diagram of a method for manufacturing a plurality of expanded microspheres in accordance with another embodiment of the present invention.

FIG. 3 is a flow-chart diagram of a method for manufacturing a plurality of expanded glass microspheres in accordance with an embodiment of the present invention.

Method 300, illustrated in FIG. 3, comprises all the steps discussed in detail above in connection with FIG. 1. In addition, the plurality of expanded microspheres 12 that result from the step of activating and expanding 108 is further subjected to a heating step 302. The heating step 302 is preferably a continuation of the activating and expanding in the step 108, but it may not be necessarily be performed in continuation of the step 108 without interruptions. The heating step 302 may be conducted at a lower temperature, same temperature, or higher temperature compared to the temperature employed during the activating and expanding step 108. Upon further heating the plurality of expanded microspheres 12 turn into a plurality of expanded microspheres with predetermined pore configuration.

Figure 4A:
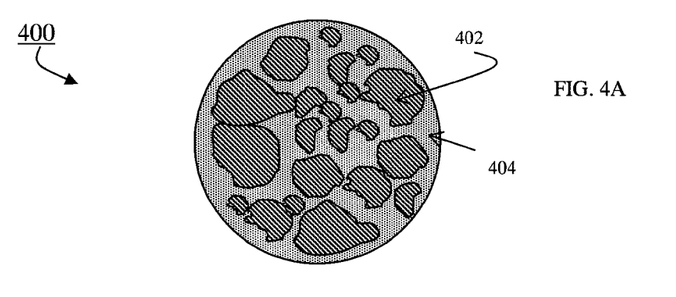
FIG. 4A is a cross-section representation of an agglomerated particle in accordance with another embodiment of the present invention.
Figure 4B:
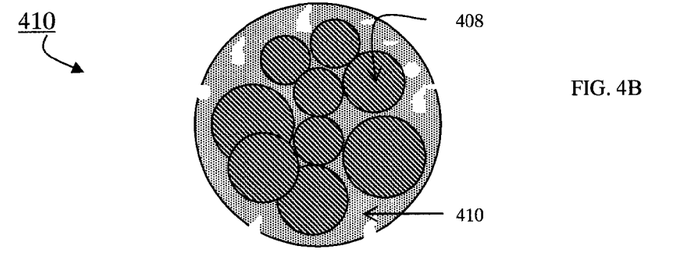
FIG. 4B is a cross-section representation of an intermediate expanded microsphere in accordance with another embodiment of the present invention.
Figure 4C:
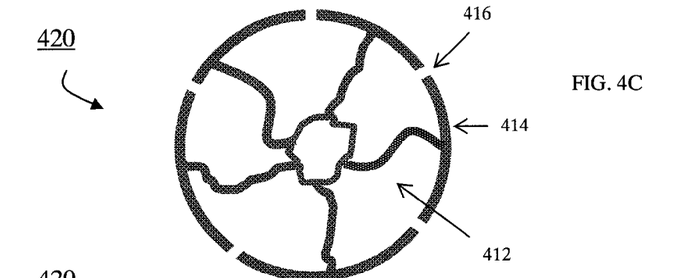
FIG. 4C is another cross-section representation of an expanded microsphere in accordance with another embodiment of the present invention.
Figure 4D:
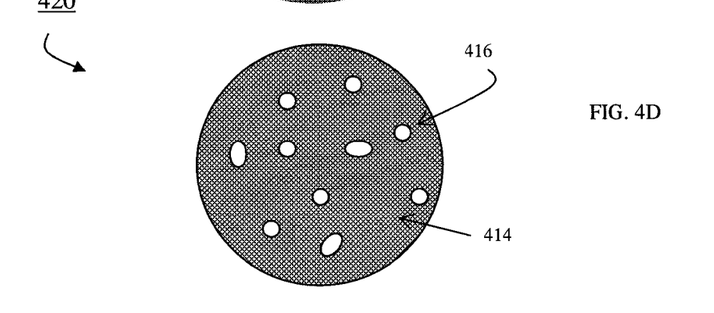
FIG. 4D is a perspective representation of an expanded microsphere manufactured based on the method for manufacturing a plurality of expanded microspheres shown in FIG. 3, in accordance with an embodiment of the present invention.

FIG. 4A is a schematic cross-sectional representation of an agglomerated particle 400 in accordance with another embodiment of the present invention. FIG. 4B is a cross-sectional representation of an intermediate expanded microsphere 410 that results from heating the agglomerated particle 400 shown in FIG. 4A. FIG. 4C is a cross-sectional representation of the final form of an expanded microsphere 420 that results from further heating the intermediate expanded microspheres 410 shown in FIG. 4B, and FIG. 4D is a schematic representation of the same expanded microsphere 420 shown in FIG. 4C, in perspective view and from outside the expanded microsphere 420, showing microperforations 416 developed in and over the surface layer (or skin layer) 414 of the expanded microspheres 420.

As illustrated in FIG. 4A, the agglomerated particle is formed by solid particles 402 that comprise finely ground glass fragments that intrinsically contain a first plurality of RE components comprising both oxidizing and reducing components. In this case the binding material 404 may optionally also comprise a second plurality of RE components with at least one of reducing or oxidizing components. The first and second plurality of RE components included in the solid materials 402, and the binding material 404 may or may not have the same components. Upon heating the agglomerated particle 400, the RE components in both the solid materials 402 and the binder material 404 activate and produce gas, thus expanding the solid particle 402 into hollow inclusions 408 and the binding material 404 into a foam like material 410, thus forming an intermediate expanded microsphere 406. Some intermixing (or inter melting, or inter fusing) of the solid materials 402 and binding material 404 takes place, the extent of which is predetermined by the deliberate selection of the compositions of the solid materials 402 and of the binding material 404. This is shown schematically in FIG. 4B. The expanded solid materials are shown in abstraction by expanded spherical particles 408, and the foamed like binding material is indicated by reference numeral 406. The voids in the foamed like binding material 406 may comprise irregular shapes, and possibly comprise interconnected pores with occasional isolated/closed pores in between. Upon continuation of heating of the expanded microsphere 410, the effect of heat causes the expanded spherical particles 408 to further expand till some of them communicate (due to the tendency to lower the surface energy), and form pockets of mostly communicating cavities, shown in FIG. 4C by reference numeral 412. However, the cavities 412 are covered by a glassy skin-like surface layer 414 which comprises a plurality of micro-perforations 416 spread relatively uniformly across the entire surface layer 414 of the expanded microsphere 420. FIG. 4D depicts schematically the expanded microsphere 420 when viewed from outside. The relative size of the plurality of micro-perforations 416 in the surface layer is grossly exaggerated for illustration purposes only. The size range of the micro-perforations 416 may vary from several nanometers to tens of microns, for example from 10 nanometers to 10 microns. As the plurality of expanded microspheres 420 are cooled to room temperature, the pore configuration developed at high temperature becomes frozen-in. According to the method described above, unique expanded microspheres can be manufactured with a hollow inner structure, and a surface layer 414 that is mechanically strong, having micro-perforations 416 which allow controlled flow of fluids in and out of the plurality of expanded microspheres 420. Depending on the size of the micro-perforations, fluid flow in and out of the expanded microspheres can be controlled as a function of differential pressure, and the fluid's physical properties, such as surface tension and viscosity. The flow and the flow rate of a fluid into and out-of the expanded microspheres can also be controlled by the average size of the plurality of micro-perforations 416 under a predetermined fluid pressure. Other factors that affect the fluid flow in this case are fluid rheology such as viscosity, and surface tension as mentioned above. The plurality of walls and the surface layer comprises substantially a glass, and the surface layer comprises a plurality of micro-perforations, the glass comprising at least one of a sulfide and ferrous iron. An average density of the plurality of expanded microspheres discussed and illustrated in connection with FIGS. 4A to 4D is above about 0.1 g/cc.

The applications envisioned for the microspheres of the present invention, include and are not limited to microfiltration, selective catalysis, drug delivery systems, sensing applications, pressure and vacuum applications, and others. The unique configuration of the plurality of expanded microspheres 420, allows for the plurality of expanded microspheres to have average particle densities as low as 0.08 g/cc to as high as over 1 g/cc. Despite the existence of microperforation in the surface layer, the plurality of the expanded microspheres according to the present invention have a relatively high crushing strength to particle density ratio, over 2000 psi/(g/cc) when compared to foamed microspheres without a solid glassy skin. The reason is that the surface layer comprises isolated and round micro-perforations (FIG. 4D), a situation that slows down crack propagation. Cracks in the surface layer of the microsphere have to propagate to a significantly longer length than when compared to a straight line. It is also possible that very finely sized micro-perforations, e.g. nano-perforations, may act as crack arresters in this case.

The solution proposed by the present invention eliminates the effect of the furnace atmosphere chemical composition, and in particular the effect of fluctuations of the oxygen concentration, on the expansion of the softened solid particles to hollow microspheres. As a result, a high yield in manufacturing of microspheres meeting the target specifications with respect to particle density and particle size can be realized. The objective is achieved at least by incorporating a plurality of reactive expansion components in the agglomerated particles. The redox reactions among the plurality of reactive expansion components, taking place within the interior of the agglomerated particles produce gas necessary to expand the agglomerated particles. Unlike the methods of the prior art, the redox reactions of the present invention are self-supporting and do not rely upon the chemical composition of the furnace atmosphere to proceed.

Further, the solution may involve disengaging the mechanism of gas formation in the agglomerated particles from the oxygen concentration within the combustion zone or within the overall furnace atmosphere. According to the method of the present invention microspheres with consistent and reproducible average particle densities can be manufactured with significantly high yield at least via the use of novel mixtures of reactive expansion components.

With the aid of the means and methods of the present invention, expanded microspheres with specific pore morphology can be manufactured by the use of the plurality of RE components and the plurality of agglomerated particle precursors. Such morphologies include closed porosity, open porosity, interconnected porosity, and a combination thereof.

The present invention also provides methods of reusing the fines and dust particles created during pulverizing and grinding of glasses used to manufacture hollow glass spheres. These fine particles are initially used to form agglomerated particles 400 which are then reprocessed by heating and expanding into the structure of the plurality of expanded microspheres 420.

The plurality of expanded microspheres of the present invention produced either by method 100 or 300 can be used in a variety of composites. In one embodiment the composite matrix is a plurality of gases at atmospheric pressure, or simply vacuum. This embodiment represents a filled space with the plurality of the expanded microspheres, and the plurality of gases, or in the case of vacuum, no or little gases. The matrix may as well be one or a combination of polymers, fibrous materials, cementiteous materials, solid materials, organic materials, inorganic materials, and liquid materials.

The plurality of expanded microspheres may also be used for microfiltration, selective catalysis, selective ion exchange systems, drug delivery systems, sensing applications, pressure and vacuum applications.

The existence of the plurality of micro-perforations provides for many possibilities to attach various functional species to the surface of the expanded microspheres, attachment that otherwise would not be possible if the surface micro-perforations did not exist. Therefore, new possibilities for designing and manufacturing high performance composites are provided by the present invention.

Although the foregoing descriptions of certain preferred embodiments of the present invention have shown, described and pointed out some fundamental novel features of the invention, it will be understood that various omissions, substitutions, and changes in the form of the expanded microspheres and its precursors or in the methods of making said precursors and said expanded microspheres as illustrated, as well as the uses thereof, may be made by those skilled in the art, without departing from the scope and spirit of the invention. Consequently, the scope of the present invention should not be limited to the foregoing discussions.

What is claimed is:

1. A method of manufacturing a plurality of expanded microspheres, comprising:
   mixing a plurality of solid particles, at least one binding material capable of binding the plurality of solid particles, and a plurality of reactive expansion components into a batch;
   forming a plurality of agglomerated particles from the batch;
   heating the plurality of agglomerated particles in an expansion equipment to above a softening temperature of at least a portion of the plurality of agglomerated particles and activating the plurality of reactive expansion components to form a plurality of intermediate expanded microspheres; and
   forming a gas and expanding the plurality of intermediate expanded microspheres into the plurality of expanded microspheres;
   wherein the step of activating the plurality of reactive expansion components occurring independently from a chemical composition of an atmosphere surrounding the plurality of agglomerated particles inside the expansion equipment, and
   the plurality of manufactured expanded microspheres comprising:
   a structure comprising a plurality of walls and a surface layer,
   the plurality of walls defining a plurality of closed pores and a plurality of open pores, the surface layer enclosing the plurality of closed pores and the plurality of open pores within the expanded microsphere,
   wherein each closed pore of said plurality of closed pores being completely surrounded by the plurality of walls,
   wherein each open pore of said plurality of open pores being surrounded partially by at least one of the plurality of walls and the surface layer,
   wherein the plurality of walls and the surface layer comprise a glass,
   wherein the surface layer comprising a plurality of perforations, and
   wherein the glass comprising at least one of a sulfide and ferrous iron.

2. The method of claim 1, wherein the plurality of solid particles comprising at least one of a plurality of raw materials, a plurality of additives, a plurality of recovered materials and a combination thereof.

3. The method of claim 1, wherein a part of or the entirety of the plurality of reactive expansion components being an integral part of at least one of the plurality of solid particles and the at least one binding material.

4. The method of claim 1, wherein said expansion equipment being a furnace heated by at least one of combusting a fossil fuel, resistive heating, convective heating, microwave heating, plasma heating, arc heating, IR heating, and inductive heating.

5. The method of claim 1, wherein the plurality of reactive expansion components comprising at least one of a reducing chemical and an oxidizing chemical capable of reacting together to form a plurality of gases.

6. The method of claim 1, further comprising:
transforming said plurality of reactive expansion components into a plurality of secondary reactive expansion components prior to expanding the plurality of intermediate expanded microspheres into the plurality of expanded microspheres, the plurality of reactive expansion components and the secondary plurality of reactive expansion components being distinct from each other.

7. The method of claim 1,
wherein expanding the plurality of intermediate expanded microspheres comprising heating the plurality of intermediate expanded microspheres and generating a plurality of expanded microspheres with predetermined pore configuration.

8. A plurality of expanded microspheres, each expanded microsphere comprising:
a structure comprising a plurality of walls and a surface layer,
the plurality of walls defining a plurality of closed pores and a plurality of open pores,
the surface layer enclosing the plurality of closed pores and the plurality of open pores within the expanded microsphere,
wherein each closed pore of said plurality of closed pores being completely surrounded by the plurality of walls,
wherein each open pore of said plurality of open pores being surrounded partially by at least one of the plurality of walls and the surface layer,
wherein the plurality of walls and the surface layer comprise a glass,
wherein the surface layer comprising a plurality of perforations, and
wherein the glass comprising at least one of a sulfide and ferrous iron.

9. The plurality of expanded microspheres of claim 8, wherein an average particle density of the plurality of expanded microspheres is from 0.08 g/cc to about 1 g/cc.

10. The plurality of expanded microspheres of claim 8, wherein an average diameter of said plurality of perforations is from about 10 nanometers to about 10 microns.

11. The plurality of expanded microspheres of claim 8, wherein the average diameter of the plurality of perforations is elected so that said perforations are capable of controlling a flow and a flow rate of a fluid into and out-of the plurality of expanded microspheres under a predetermined fluid pressure.

12. The plurality of expanded microspheres of claim 11, wherein said perforations are further capable of controlling a flow and a flow rate of a fluid into and out-of the plurality of expanded microspheres based on at least one of surface tension and viscosity of said fluid and an average size of said plurality of perforations under a predetermined fluid pressure.

13. The plurality of expanded microspheres of claim 8, wherein the plurality of expanded microspheres comprising reprocessed fines created during pulverizing and grinding of glasses used to manufacture hollow glass microspheres.

14. A system, comprising:
a plurality of the expanded microspheres in accordance with claim 8, and
a matrix enclosing the plurality of encapsulated expanded microspheres.

15. The plurality of expanded microspheres of claim 8, wherein an average particle size for the plurality of the expanded microspheres is in the range of about 10 microns to 1000 microns.

16. The plurality of expanded microspheres of claim 8, wherein an average thickness of said plurality of walls and of said surface layer is in the range of 1 micron and 20 microns.

17. The plurality of expanded microspheres of claim 8, wherein the surface layer seals the structure from the outside.

18. The plurality of expanded microspheres of claim 8, wherein an average crushing strength of said plurality of expanded microspheres is about 2000 psi for an average expanded microsphere particle density of about 0.3 to 0.4 g/cc.

19. The plurality of expanded microspheres of claim 8, wherein said plurality of perforations are spread uniformly across the entire surface layer of the expanded microspheres.

20. The plurality of expanded microspheres of claim 8, further comprising a plurality of functional species attached to the surface of the plurality of expanded microspheres via said plurality of perforations.

* * * * *